Dec. 2, 1969  E. C. WARRICK ET AL  3,481,438
ADJUSTABLE CAM ENGAGED CLUTCH
Original Filed Oct. 8, 1965  3 Sheets-Sheet 1

INVENTOR
EDWARD J. NIEHAUS, JR.
EDWARD C. WARRICK

BY Strauch, Nolan, Neale, Nies & Kurz

ATTORNEYS

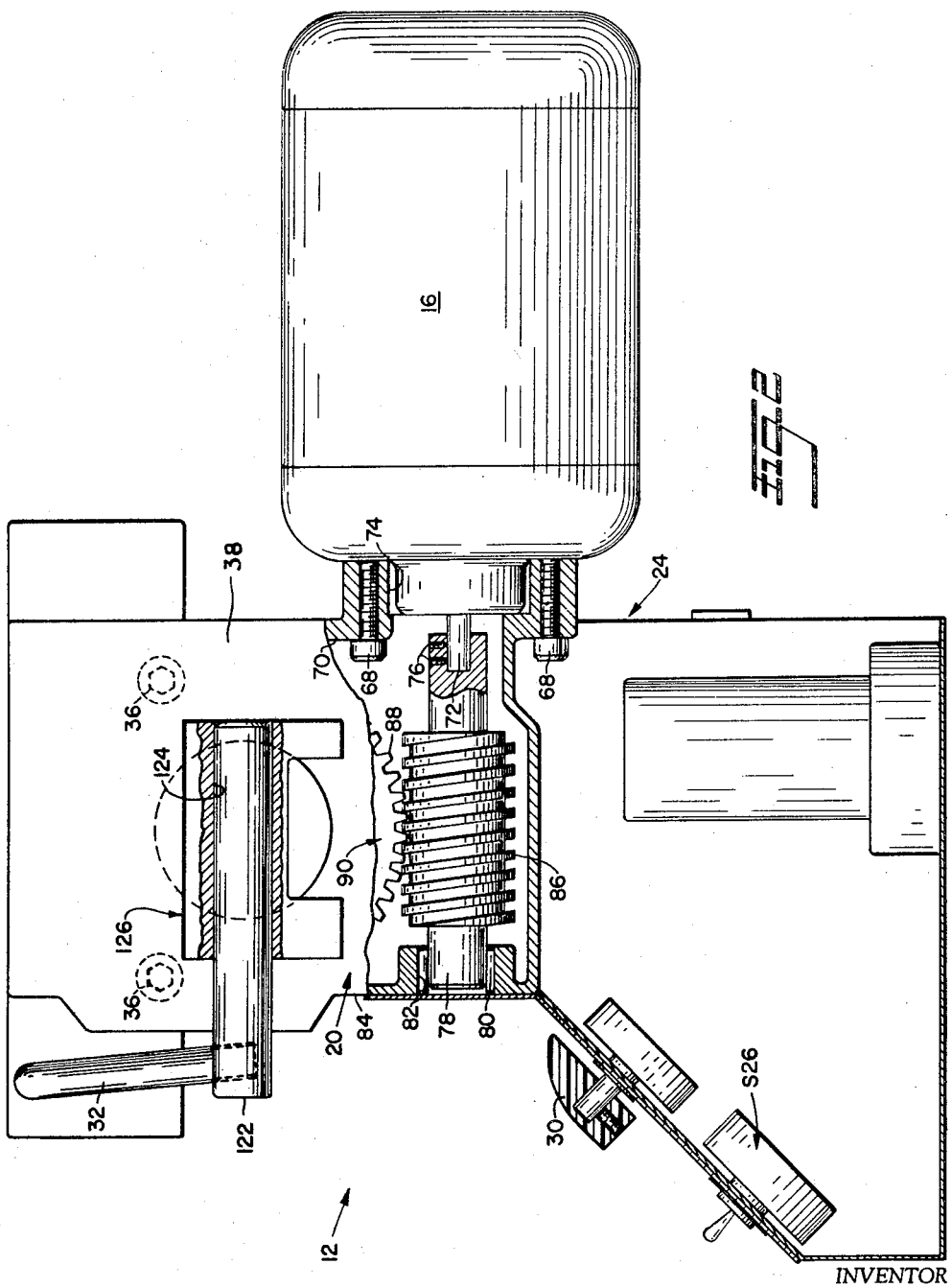

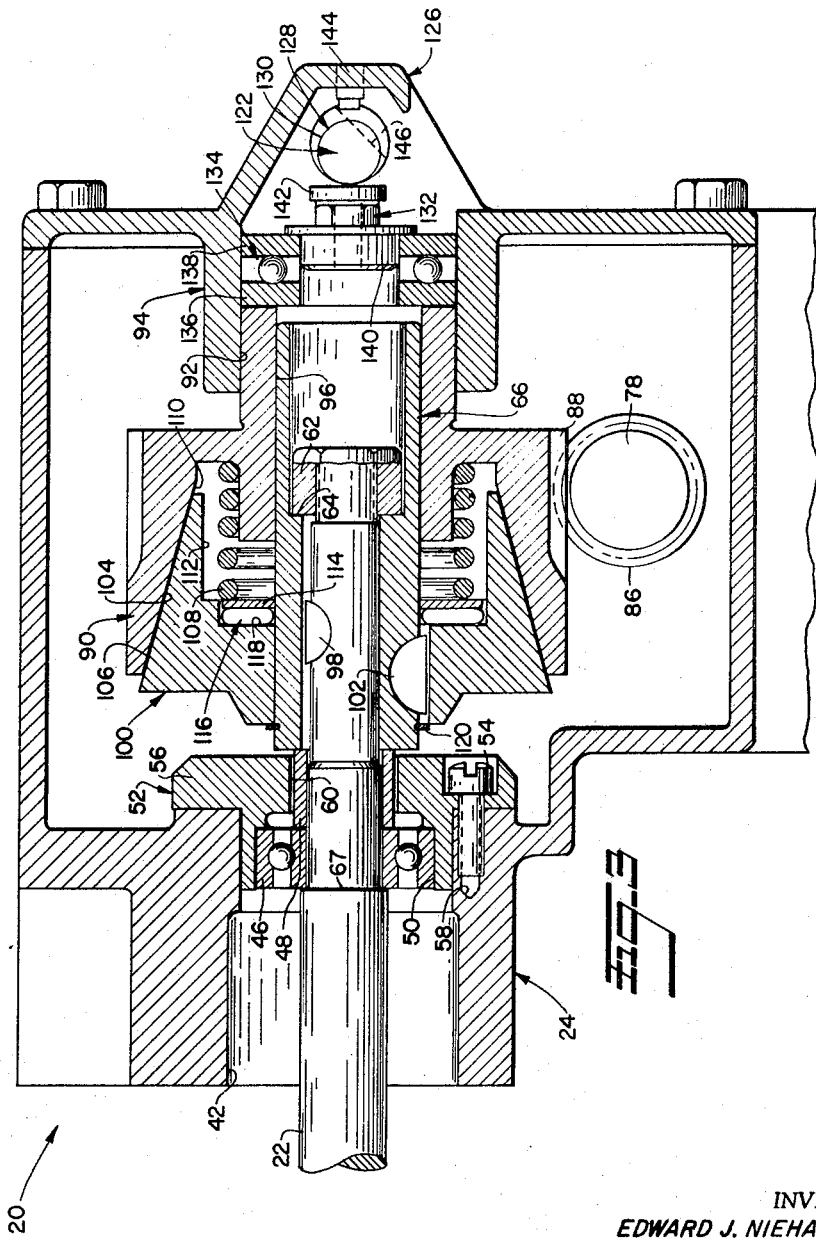

United States Patent Office 3,481,438
Patented Dec. 2, 1969

3,481,438
ADJUSTABLE CAM ENGAGED CLUTCH
Edward C. Warrick and Edward J. Niehaus, Jr., Pittsburgh, Pa., assignors to Rockwell Manufacturing Company, Pittsburgh, Pa., a corporation of Pennsylvania
Original application Oct. 8, 1965, Ser. No. 494,168, now Patent No. 3,396,826, dated Aug. 13, 1968. Divided and this application Mar. 21, 1968, Ser. No. 714,966
Int. Cl. F16d 21/00, 7/02, 43/24
U.S. Cl. 192—93
5 Claims

ABSTRACT OF THE DISCLOSURE

Power drive units for machine tools and the like including an electric motor, a speed control system capable of maintaining the motor speed at a selectively adjustable level despite changes in the load on the motor and including arrangements for reversing the direction of motor rotation and for bypassing the speed regulating circuitry to operate the motor at a higher speed, and an arrangement including a selectively engageable clutch which can be adjusted to slip at selectively variable torques for drive-connecting the motor to the device with which it is associated. The clutch includes input and output elements which are normally biased out of engagement and a control arrangement for effecting engagement of the clutch elements which includes a cam-type operator and a thrust assembly disposed between the operator and one of the clutch elements.

---

This application is a division of application No. 494,168 filed Oct. 8, 1965, and now Patent Number 3,396,826.

This invention relates to power drive units and, more particularly, to self-contained, selectively engageable, variable speed power drive units for machine tools and the like.

The power drive units provided by the present invention may advantageously be employed to operate the table feeds of milling machines, and the principles of the present invention will therefore be developed by relating them to this particular application of the invention. However, as the present invention has other applications, the ensuing discussion is intended to be illustrative and not definitive of the scope of the invention, which is limited only by the appended claims.

Most, if not all, of the smaller milling machines currently on the market have table feeds which must be operated manually despite the recognized advantages of power feeds. This is because the power feeds heretofore available have been too complex and, therefore, too expensive to manufacture and maintain to make them economically feasible for other than high capacity machines.

Accordingly, it is a primary object of the present invention to provide novel power drive units for milling machine table feeds and other applications which are comparatively simple and inexpensive to manufacture and maintain.

Another important and related object of this invention is the provision of novel improved power drive units which can be readily added as accessories to machines having manual feeds.

Generally speaking, the power drives by which these and other objects of the present invention are accomplished are a unitized attachment including an electric motor, an electric control for maintaining the motor at an adjustable operating speed, and a novel transmission for connecting the motor to, for example, the lead screw of a milling machine table feed. The transmission includes a clutch which permits the lead screw to be engaged and disengaged and also prevents the motor from stalling and overheating when the table reaches the limits of its travel. This is an important feature of the present invention as it completely eliminates the limit switches and associated circuitry heretofore commonly employed for this purpose.

From the foregoing, it will be apparent that further important but more specific objects of the present invention include novel power drive units which:

(1) Are of unitized construction and can be easily attached to existing machines;

(2) Include a novel transmission which permits selective engagement of the motor and the feed to which it is connected and eliminates the necessity of providing limit switches and the like to prevent the power drive motor from stalling and overheating;

(3) In conjunction with the preceding object, have transmissions which are extremely rugged and durable; and (4) In conjunction with object No. 2, have transmissions in which the magnitude of torque required to produce clutch slippage can be varied, thereby further increasing the versatility of the power drive unit.

Other objects, additional advantages, and further important features of the present invention will become more fully apparent from the appended claims and as the ensuing detailed description and discussion proceeds in conjunction with the accompanying drawing, in which:

FIGURE 2 is a side view of the power drive unit with portions of its housing broken away to show the location of its major assemblies and components; and FIGURE 3 is a section through a transmission or drive train employed in the unit to drive connect the motor of the unit to the lead screw or other input element of the mechanism operated by the drive unit.

Figure 1:
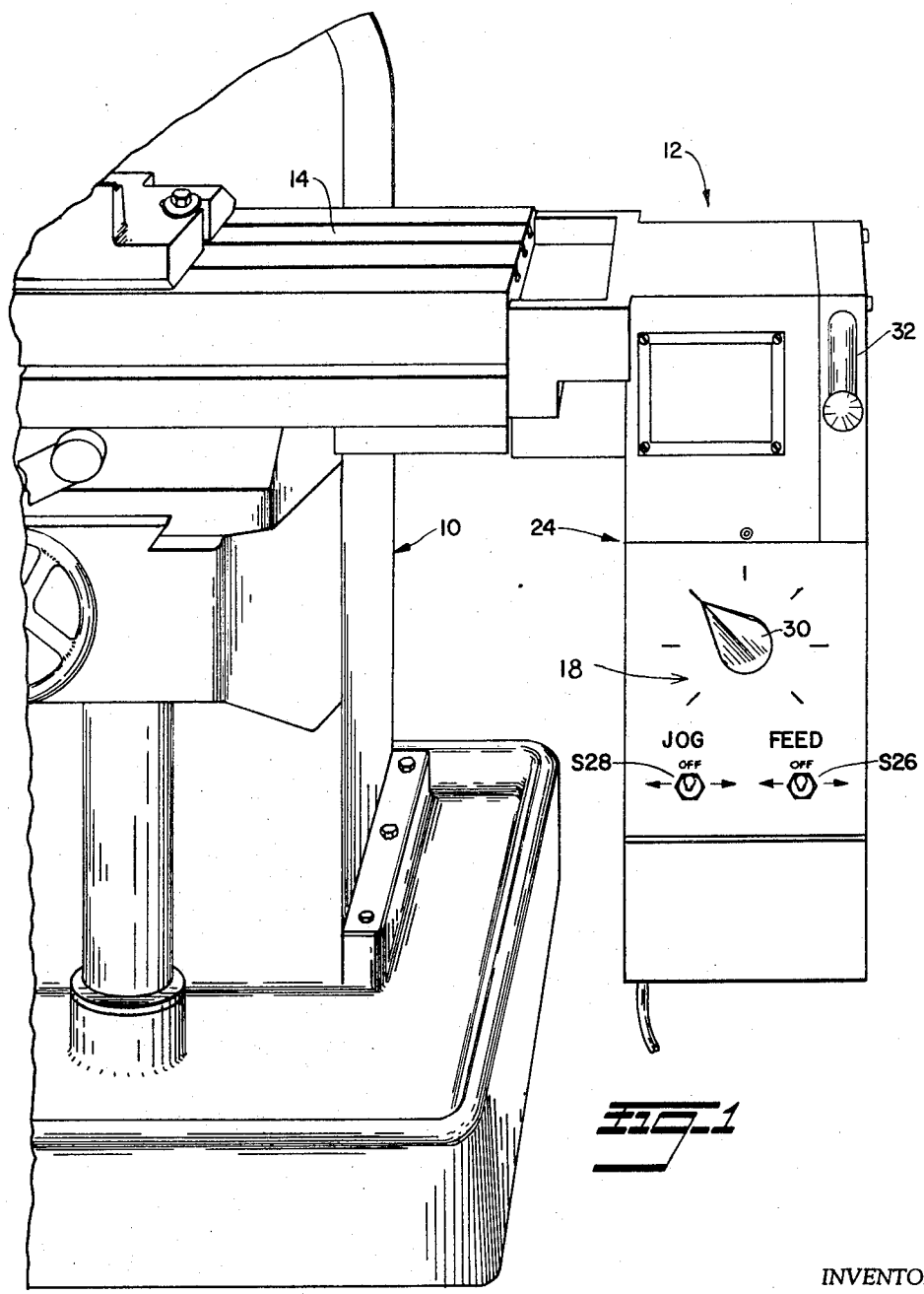
FIGURE 1 is a perspective view of a power drive unit constructed in accord with the principles of the present invention and a portion of a milling machine to which the unit is attached to operate the table feed of the milling machine.

Referring now to the drawing, FIGURE 1 illustrates a milling machine 10 provided with a power drive unit 12 constructed in accord with the principles of the present invention to feed or traverse the table 14 of the milling machine. The major components of drive unit 12 are a universal type electric motor 16, an electronic control system 18 for the motor, and a transmission or drive train 20, which drive connects motor 16 to the lead screw 22 of the milling machine table feed (not illustrated except for the lead screw). The foregoing components are encased in or attached to a housing 24 on which feed and jog switches S26 and S28, a motor speed regulating knob 30, and a clutch operating lever 32 are mounted.

The details of the milling machine and its table feed are not part of the present invention; and it is therefore not considered necessary to illustrate or describe the milling machine or table feed in detail herein. Briefly speaking, however, the workpiece to be machined is fixed to table 14 and the table is fed or traversed to the left (or right) as oriented in FIGURE 1 to move the work against a rotating tool. This is done by rotating the lead screw 22 mentioned previously, which is axially fixed relative to the table 14 of the machine and passes through a fitting fixed to the frame of the machine and provided with complementary internal threads. Consequently, as the lead screw is rotated, the table moves along it to the left or right as viewed in FIGURE 1, depending upon the direction of rotation of the lead screw.

In the smaller milling machines, which are the type to which the present invention particularly relates, the lead screw is rotated manually. As discussed previously, however, it is the purpose of the present invention to provide an attachment or accessory which may be added to such a milling machine to provide a power-operated lead screw.

To attach drive unit 12 to milling machine 10, a tray (not shown) at the right-hand side of the machine and a crank (likewise not shown) attached to the outboard end of lead screw 22 are removed; and the drive unit is bolted to the table 14 of the milling machine by bolts 36 which extend through transmission housing 38 (which comprises the upper portion of drive unit housing 24).

With drive unit 12 bolted to milling machine table 14, lead screw 22 extends through an aperture 42 in transmission housing 38 into the interior of the transmission housing. The lead screw is rotatably supported in transmission housing 38 by a bearing 46 and extends seriatim through the inner race of the bearing and a bearing spacer 48. Bearing 46, as shown in FIGURE 3, is seated in an annular recess 50 in a bearing holder 52. The bearing holder is fitted in the aperture 42 through the side of transmission housing 38 and is retained in place by screws 54, which extend through bearing holder flange 56 into drilled and tapped apertures 58 in the transmission housing.

Bearing spacer 48 is a cylindrical tube which abuts bearing 46 and extends in surrounding relationship to lead screw 22 through an aperture 60 in the bearing holder in communication with recess 50.

As mentioned previously, lead screw 22 is fixed relative to the table of milling machine 10. To prevent axial movement between the lead screw and transmission 20, a nut 62 is threaded on the end of the lead screw. Nut 62 engages an annular internal shoulder 64 in a cylindrical drive shaft 66, which is fixed against movement to the left relative to the transmission housing 38 by bearing spacer 48. This prevents lead screw 22 from moving to the left (as viewed in FIGURE 3) relative to the transmission. Movement to the right is prevented by the engagement of an annular shoulder 67 on lead screw 22 with the inner race of bearing 46.

With drive unit 12 thus assembled to milling machine table 14, lead screw 22 can be driven by drive unit motor 16 which, as best shown in FIGURE 2, is fixed as by cap screws 68 to the rear wall 70 of transmission housing 38.

The output shaft 72 of motor 16 projects through an opening 74 in wall 70 into the interior of the transmission housing where it is fixed, as by set screws 76, to one end of a worm shaft 78. Worm shaft 78 is rotatably supported in the transmission housing by motor output shaft 72 and by roller bearing 80, which surrounds the worm shaft and is fitted in a recess 82 in the front wall 84 of transmission housing 38.

Referring now to both FIGURES 2 and 3, worm shaft 78 carries a worm 86 which engages teeth 88 formed on the periphery of a clutch input element 90. The input element is mounted for rotation and for axial movement in the bore 92 of a bearing boss 94 formed at one end of transmission housing 38. Clutch input element 90 surrounds the drive shaft 66 mentioned previously, which is rotatably supported in a bore 96 through clutch element 90 and by lead screw 22 which it surrounds. The clutch element is fixed to lead screw 22 by a half-moon key 98. Also surrounding drive shaft 66 is a second or output clutch element 100 which is fixed to the drive shaft by a half-moon key 102.

As shown in FIGURE 3, clutch elements 90 and 100 have complementary internal and external conical clutch faces 104 and 106 which, when engaged, establish a drive train from motor output shaft 72 through worm shaft 78, worm 86, clutch input element 90, clutch output element 100, key 102, drive shaft 66, and key 98 to lead screw 22.

Clutch elements 90 and 100 are normally urged apart to maintain clutch surfaces 104 and 106 out of engagement by a compression spring 108 disposed in complementary annular recesses 110 and 112 in clutch members 90 and 100, respectively. At one end, spring 108 bears against the end of the recess 110 in clutch member 90.

The other end of spring 108 abuts the race 114 of a bearing 116 fitted in a recess 118 in clutch member 100. Bearing 116 permits spring 108 to rotate with clutch member 90 relative to clutch member 100 when the clutch members are not engaged.

Clutch member 100 is prevented from moving to the left by a snap ring 120 fitted in shaft 66 at the left-hand end of the output member. Clutch member 90 is moved into engagement with stationary clutch member 100 by rotating the clutch operating lever 32 (see FIGURE 2) in a clockwise direction. Operating lever 32 is threaded into one end of a shaft 122 which is rotatably supported in the bore 124 of a shaft supporting boss 126 at the right-hand end of transmission 20.

Formed on shaft 122, integrally or as a separate member, is a cam 128 having a cam surface 130. As lever 32 and shaft 122 rotate, cam 128 moves a thrust assembly 132 to the left, forcing clutch input member 90 to the left until its clutch surface 104 frictionally engages the clutch surface 106 of cam output member 100.

As shown in FIGURE 3, thrust assembly 132 includes a bearing 134 disposed in the bore 92 in bearing boss 94. One race 136 of the bearing engages the right-hand end of clutch input member 90. Engaging the other race 138 of bearing 134 is a bearing plug 140, which fits into bearing 134. Threaded into bearing plug 140 is an adjusting screw 142, the head of which engages the cam surface 130 of cam 128. By threading the adjusting screw into and out of bearing plug 140, the force exerted by cam 128 through the thrust assembly to move clutch input member 90 against clutch output member 100 can be varied. This provides a means of varying the frictional force between clutch surfaces 104 and 106 when they are engaged and, therefore, the torque which the clutch will transmit without slippage.

Rotation of clutch operating lever 32 between the clutch engaged and disengaged positions is limited by a stop 144, threaded into transmission housing boss 126, which engages opposite edge portions of a flat 146 milled or otherwise formed on shaft 122.

The selectively engageable clutch arrangement just described is an important feature of the present invention since, by engaging and disengaging the clutch, the milling machine table 14 can be moved through any desired traverse and can be positioned at any particular point desired. In addition, this arrangement is an important safety feature since, when table 14 reaches either of its limits of movement, clutch member 90 will slip relative to clutch member 100. This prevents motor 16 from being stalled and overheated when the table reaches a limit position without the necessity of employing the limit switches and associated circuitry heretofore utilized for this purpose.

In addition to the novel, improved transmission just described, the present invention also includes the control system 18 for motor 16 including switch S26 and control knob 30 which permits the motor to be operated at varying speeds to vary the rate of traverse of milling machine table 14 and which permits the direction of rotation of the motor output shaft 72 to be reversed so that the table may be traversed to either the left or the right as viewed in FIGURE 1. In addition, this system includes a novel jog switch arrangement including jog switch S28 which permits the normal speed regulating circuitry to be bypassed, permitting the table to be rapidly traversed from one point to another, when desired. The jog switch circuitry also includes circuitry for reversing the direction of motor rotation so that rapid traverse may be made in either direction.

The motor control system thus briefly described is disclosed in detail in copending parent application No. 494,168 filed October 8, 1965 now Patent No. 3,396,826, and hereby incorporated by reference herein.

From the foregoing description of an exemplary application of the principles of the present invention, it will be apparent to those skilled in the arts to which the present invention relates that the principles of this invention are by no means limited to this one particular application of them. Therefore, as mentioned previously, the foregoing description of one particular application of these principles is intended to be merely illustrative and not limiting. Also, it will be apparent to those having the appropriate skills that the illustrated embodiment of the present invention is not limited to use with one particular type of milling machine but that it can be adapted to any milling machine having a manual table feed.

The invention may be embodied in other specific forms without departing from the spirit or essential characteristics thereof.

What is claimed and desired to be secured by Letters Patent is:

1. A transmission for power tools and the like having a rotatable input shaft, comprising:
   (a) a hollow drive shaft adapted to surround said input shaft;
   (b) means for fixing said input shaft to said drive shaft for rotation therewith;
   (c) a clutch assembly having:
      (1) a first clutch element fixed to said drive shaft,
      (2) a second clutch element journalled on said drive shaft and axially and rotatably movable relative thereto, and
      (3) means biasing said clutch elements out of operative engagement;
   (d) means adapted to drive connect the second of said clutch elements to a power source; and
   (e) selectively operable control means for engaging said second clutch element and moving it into driving engagement with the first clutch element against the force exerted by said biasing means comprising:
      (1) a control shaft having a cam thereon rotatably mounted with the cam surface spaced from said second clutch element;
      (2) a member for rotating said control shaft to thereby cause said cam surface to move toward and away from said second clutch element; and
      (3) a thrust assembly positioned between said second clutch element and said cam, said assembly comprising a thrust bearing engageable with said second clutch element, a bearing plug supported by said thrust bearing, and a member extending from said bearing plug and engageable by said cam, whereby rotation of said control shaft to cause movement of said cam toward and away from said second clutch element effects clutch engaging and disengaging movement of said clutch element, said last-mentioned member being adjustable relative to said bearing plug in a direction toward and away from said cam, whereby the force exerted on the clutch element biasing means by the clutch control means and thereby the torque required to cause slippage between the clutch elements may be selectively varied.

2. The transmission of claim 1, together with a bearing concentric with and spaced from one end of said drive shaft for rotatably supporting said input shaft.

3. The transmission of claim 1, together with a housing and means including a stop fixed to said housing for limiting rotation of said control shaft between first and second positions in which the second clutch element is respectively engaged with and disengaged from the first clutch element.

4. A power drive unit for power tools and the like comprising a transmission as defined in claim 1, a housing for said transmission, and means for attaching said housing to a power tool or the like.

5. The power drive unit of claim 4, together with a motor and means fixing said motor to said housing.

References Cited

UNITED STATES PATENTS

| | | | |
|---|---|---|---|
| 442,374 | 12/1890 | Hartman et al. | 192—93 |
| 1,254,863 | 1/1918 | Suther. | |
| 2,265,502 | 12/1941 | Williams | 192—93 |
| 2,462,498 | 2/1949 | Himoff et al. | |
| 2,595,418 | 5/1952 | Seely | 192—93 |

BENJAMIN W. WYCHE III, Primary Examiner

U.S. Cl. X.R.

192—56, 111